United States Patent [19]

Harrison

[11] Patent Number: 4,858,205
[45] Date of Patent: Aug. 15, 1989

[54] MULTI-BARREL AIR GUN MODULE

[75] Inventor: Earnest R. Harrison, Plano, Tex.

[73] Assignee: Halliburton Geophysical Services, Inc., Houston, Tex.

[21] Appl. No.: 236,694

[22] Filed: Aug. 24, 1988

[51] Int. Cl.[4] .......................................... H04R 23/00
[52] U.S. Cl. .................................... 367/144; 181/120; 367/23
[58] Field of Search ................ 181/101, 106, 108–111, 181/118, 120; 367/15, 56, 23, 106, 129, 130, 141, 142, 144, 146, 153, 154, 173

[56] References Cited

U.S. PATENT DOCUMENTS

| | | | |
|---|---|---|---|
| 4,016,952 | 4/1977 | Reed et al. | 181/118 |
| 4,384,632 | 5/1983 | Wolcott et al. | 181/118 |
| 4,633,970 | 1/1987 | Mifsud | 181/120 |
| 4,658,384 | 4/1987 | Dragoset, Jr. et al. | 367/144 X |
| 4,715,023 | 12/1987 | Otto | 367/144 |
| 4,719,987 | 1/1988 | George, Jr. et al. | 367/130 |

FOREIGN PATENT DOCUMENTS 2176605A  6/1986  United Kingdom ................ 181/113

OTHER PUBLICATIONS

Safar, M. H., "Efficient Design of Air Gun Arrays", Geophysical Prospecting 24, pp. 773–787 (1975).
Giles, B. F., and Johnston, R. C., "System Approach to Air-Gun Array Design", Geophysical Prospecting 21, pp. 77–101 (1973).

Primary Examiner—Brian S. Steinberger
Attorney, Agent, or Firm—Mark E. McBurney; Joseph A. Walkowski

[57]                         ABSTRACT

The present invention comprises a multi-barrel seismic source air gun module for use in a marine environment, preferably comprising a plurality of air gun barrels symmetrically disposed in a single plane about and rigidly secured to a control head containing means for actuating said barrels.

13 Claims, 3 Drawing Sheets

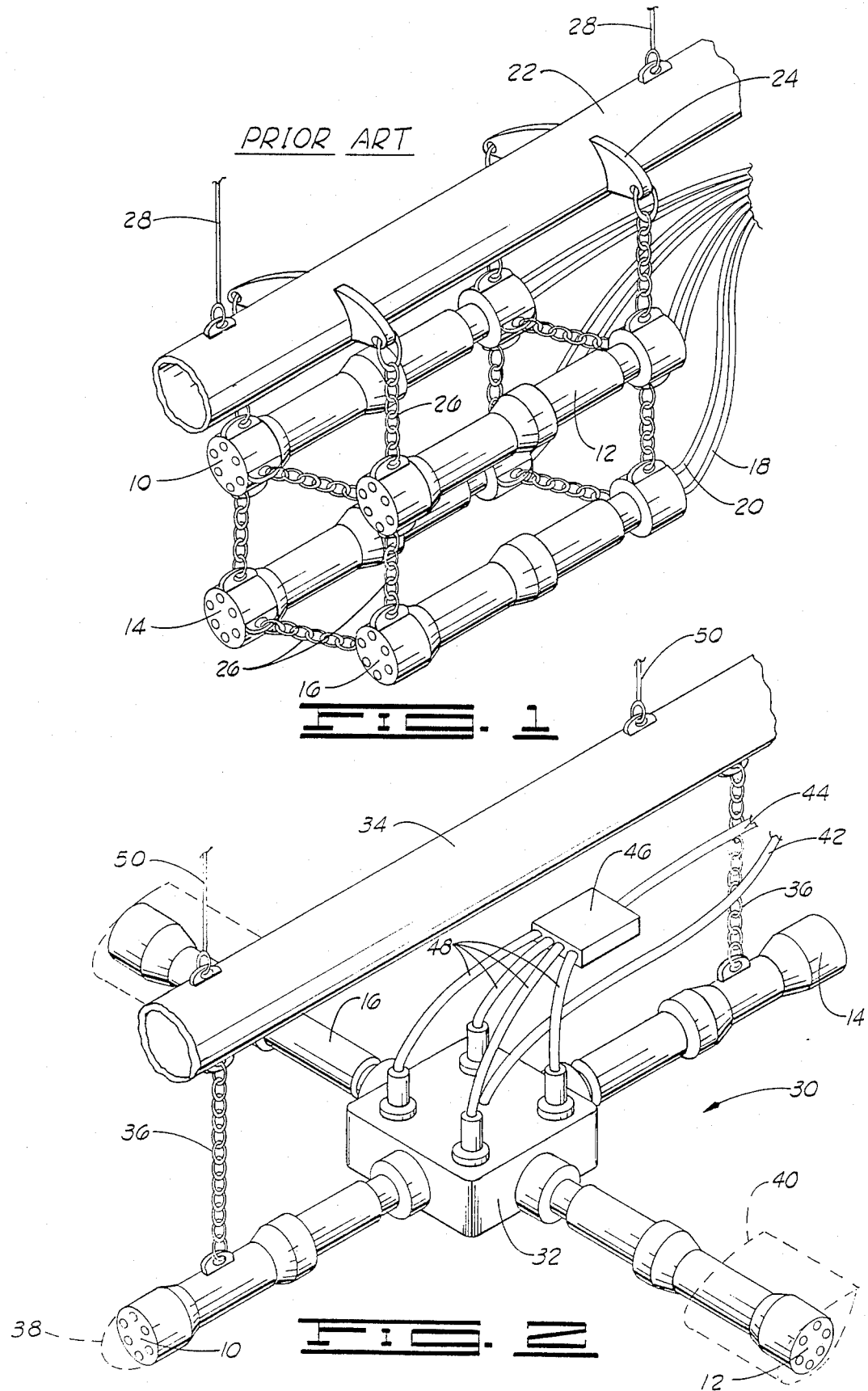

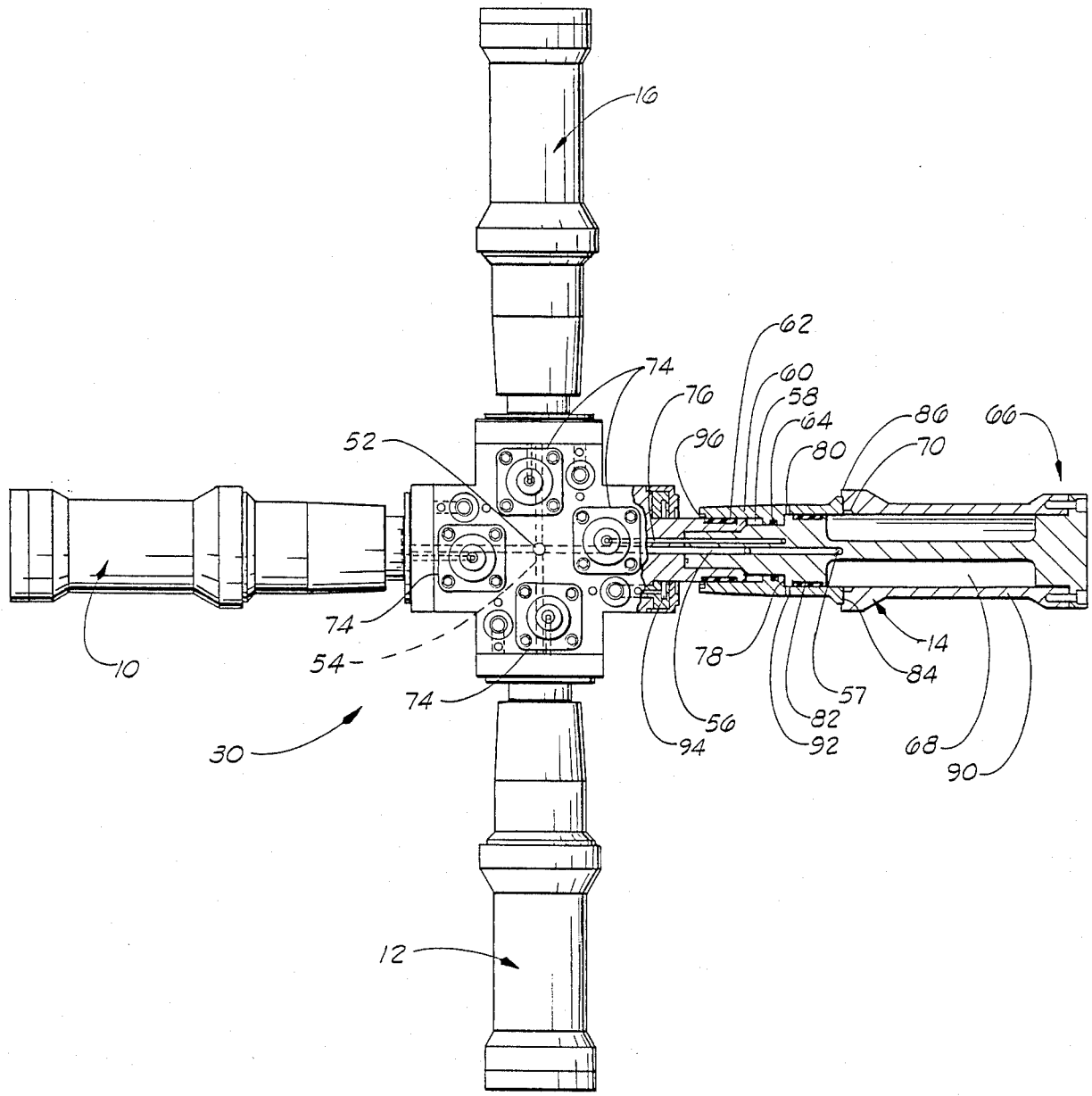
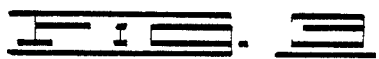

MULTI-BARREL AIR GUN MODULE

BACKGROUND OF THE INVENTION

The present invention relates to the generation of seismic energy in a marine environment via the use of seismic sources employing the abrupt release of a pressurized gas.

In marine seismic exploration, the term "marine" as used herein being intended to encompass any body of water regardless of its location or depth, a pulse of acoustic energy is released into the water at close intervals to generate acoustic waves that propagate through the water and into the earth's crust. The waves are reflected and refracted by subsurface formations and at interfaces therebetween, thereafter traveling back to receivers, at or closely beneath the earth's surface where the waves are converted into electrical signals and are recorded on instruments as digital data for subsequent processing followed by interpretation and analysis.

In recent years, the dominant marine seismic energy source has been the air gun, a device which releases high pressure air, typically at 2,000 to 6,000 psi, into the water to create the desired acoustic wave. A state-of-the art air gun design disclosing and claiming a unique 360 degrees post design is disclosed in U.S. Pat. No. 4,623,033 assigned to Geophysical Service Inc., although air guns are designed and manufactured by numerous vendors and the specific gun design utilized with the present invention is not critical to its operation. An air gun utilizing a dual chamber reciprocating shuttle design is disclosed in U.S. Pat. No. 4,211,300, assigned to Western Atlas International, Inc.

It is known in the art to dispose a plurality of air guns in an array for several purposes. For example, U.S. Pat. No. 4,108,272, assigned to Western Atlas International, Inc. discloses the concept of grouping three or more air guns tuned to different pulse frequencies to generate a simple, non-repetitive pulse train during a recording cycle. U.S. Pat. No. 4,648,479, assigned to Exxon Production Research Co., discloses a multi-chamber air gun wherein the exhaust port sizes and locations may be chosen so that air bubbles emanating therefrom will interact or "coalesce", the benefits of which will be hereinafter discussed; the use of guns timed to different frequencies is also disclosed. Another multi-chamber gun is disclosed in U.S. Pat. No. 4,381,044, also assigned to Exxon Production Research Co. U.S. Pat. Nos. 4,034,827, 4,047,591 and 4,719,987, assigned to the assignee of the present invention, disclose the use of arrays of multiple air guns and the '987 patent illustrates an actual physical arrangement of an air gun array as deployed in the prior art, wherein guns are arranged in groups of four of similar orientation and are linked together by flexible support means such as chains or cables. U.K. Patent Application No. GB2176605A, assigned to Exxon Production Research Co., discloses air guns deployed in a four-gun configuration similar to that disclosed in the aforementioned '987 patent and suggests that a group of three or more guns at critical intergun distances maximizes suppression of successive oscillations of the large bubble created by the coalescing smaller bubbles of the individual guns, thereby maximizing the "primary to bubble" ratio, the latter being defined as the amplitude ratio of the primary signal component of the seismic signal to the envelope of the accompanying successive components of the signal. The foregoing patent references Safer, M. H., "Efficient Design of Air Gun Arrays," *Geophysical Prospecting* 24, 773–787 (1975) regarding air gun spacing in arrays.

It is well known that in air gun arrays, groups or clusters of air guns deployed in close proximity to each other generate an acoustic pulse from the coalesced bubbles of the individual guns in which the primary to bubble ratio exceeds that of a pulse generated by a single gun of the same volume as that of the combined volumes of the clustered guns. See Giles, B. F., and Johnston, R. C., "System Approach to Air-Gun Array Design", *Geophysical Prospecting* 21, 77–101 (1973).

The relationship for air gun acoustic pressure output can be represented as follows:

$$P_a = NKV^{\frac{1}{3}}$$

Where:

$P_a$ = Acoustic pressure, bar-meters
N = The number of air guns
K = Constant for the particular air gun porting
V = Air gun volume, cubic inches Therefore, in order to alter (increase) acoustic pressure output using the same chamber pressure, one can either increase chamber volume of a gun (V), increase the gun (porting) size (K), or increase the number (N) of guns. Assume that one wishes to obtain the maximum acoustic output for a given air gun chamber volume. Further assume that one may utilize a 40 cubic inch chamber volume air gun manufactured by Geophysical Service Inc., assignee herein, and designated as a GSI Sleeve Gun I, ("K"=0.585) or a larger, 160 cubic inch chamber volume air gun of the same manufacture, designated as a GSI Sleeve Gun II ("K"=0.630). If the chamber volume "V" of the Sleeve Gun I is increased from 40 to 160 cubic inches, $P_a$=3.17 bar-meters. If an unmodified Sleeve Gun II is employed, $P_a$=3.42 bar-meters. If four (4) unmodified Sleeve Gun I's are employed, giving a total of 160 cubic inches of chamber volume, $P_a$=8.00 bar-meters, proving the vastly greater efficiency of using many guns of smaller volume rather than a few larger guns, an approach followed by a few geophysical companies for some time.

The above result is modified somewhat by placing guns close enough to one another so that their individual bubbles coalesce into a larger bubble size. Such placement results in a reduction of the acoustic pressure radiated by the gun cluster, due to the interaction effects of each gun changing the ambient pressure of neighboring guns. This reduction is on the order of fifteen percent, which would reduce the output in the above example to approximately 6.80 bar-meters, still a sizeable increase over the option of using a single, larger gun of equal volume to the clustered, smaller gun.

An advantage of using multiple "coalesced" air guns is the gain in the higher frequencies, as a smaller air gun has a short pulse length (higher frequency content) than the signature of a larger air gun. By using multiple small guns, the small air gun pulse length (higher frequency content) is maintained while the larger air gun bubble pulse is achieved, providing the lower bubble frequencies. This characteristic has the effect of broadening the acoustic spectra without appreciably affecting the lower frequencies, which are primarily generated by the bubble oscillations.

A problem inherent in the close spacing of coalesced air guns, however, is damage to the guns, air hoses, electrical cables and associated mounting hardware (such as shackles and chains, etc.) due to the recoil of each individual air gun plus the pressure waves caused by each air gun acting on surrounding air guns. The continual movement of the reacting air guns can cause catostrophic damage if a chain should part or at the least causes rapid wear of the mounting hardware, thus changing the air gun cluster spacing, which in turn can lead to a change in the cluster's acoustic pulse "signature", changing the frequency spectra and lowering performance from the original design optimum.

SUMMARY OF THE INVENTION

In contrast to the prior art means of clustering guns, the multi-barrel air gun module of the present invention balances the aforementioned recoil forces and permanently fixes the location of each gun barrel in a module.

The present invention employs a plurality of air gun barrels secured at their head ends to a single, common control head, the disposition of the barrels about the head being symmetrical, either in a single plane, or in three dimensions. The air supply hoses and electrical cables for gun actuation and monitoring run from an air gun support, typically a longitudinally extending boom supporting multiple gun modules, to the centered control head of each module, which is the location of least bubble action.

The present invention thus provides the output enhancement of prior-art clustered guns without the associated propensity for self-destruction and performance drift from design parameters. In addition, as will be illustrated in the description of the preferred embodiment of the invention, the disposition of barrels in the gun module of the present invention can be effected so that all barrels of the gun module, and therefore all exhaust ports from which high pressure air exits the gun to create a seismic pulse, are located at the same depth below the water, so that the pressure waves from all ports in a module reach the target area at the same time, thereby reducing interwave interference and enhancing the energy of the wave reflected and refracted from subsurface formations to the receiving transducers. This is not true with the common mounting methods being used for gun clusters, such as are illustrated in the aforementioned U.S. Pat. No. 4,179,987 and U.K. Patent Application No. GB2176605A, as well as FIG. 1 of the drawings herein, all arrangements being a two-layer or two-plane arrangement for a cluster of four guns.

BRIEF DESCRIPTION OF THE DRAWINGS

The present invention will be more fully understood by one of ordinary skill in the art through a review of the following detailed description of the preferred embodiment, taken in conjunction with the accompanying drawings, wherein:

FIG. 1 is a perspective view of a four gun cluster according to the PRIOR ART disposed from a supporting boom.

FIG. 2 is a perspective view of a four barrel gun module according to the present invention disposed from a supporting boom.

FIG. 3 is a detailed top elevation of a four barrel gun module of the present invention with a single gun in section.

DETAILED DESCRIPTION OF THE PREFERRED EMBODIMENT

Figure 4:
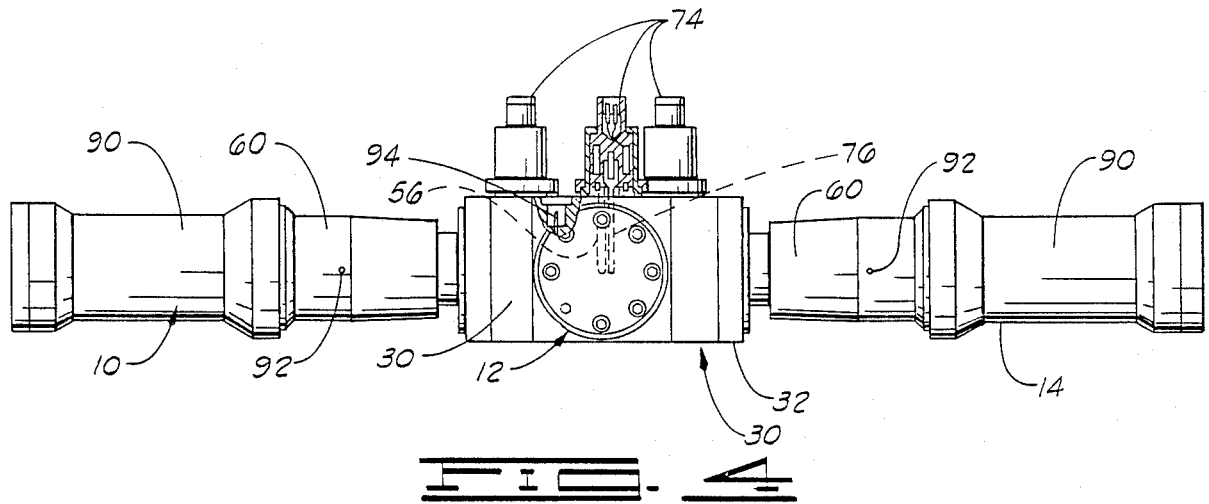
FIG. 4 is a detailed side elevation of the four barrel gun module of FIG. 3.

To obtain an appreciation for the gun cluster design of the prior art, turn to FIG. 1 wherein four air guns 10, 12, 14 and 16 are disposed in a square or rectangular configuration, guns 10 and 12 being arranged in an upper plane and 14 and 16 being in a parallel, lower plane, all four guns having substantially parallel orientation and having their heads disposed in the same direction to facilitate the connection of air hoses 18 and electrical cables 20 thereto. Guns 10-16 are slung under a boom 22 via laterally extending struts or spars 24, to which are connected the chain and shackle assemblies 26 which are secured to guns 10-16 and which generally maintain gun location and orientation. Boom 22 is in turn suspended from a float or paravane (not shown) by cables 28, in a manner well known in the art. It can readily be seen that this means of clustering guns does not provide accurate gun disposition, the latter of which is further affected by water drag as the cluster is towed through the water while firing proceeds. Moreover, as noted previously, this loose and flexible chain and shackle arrangement, while necessary to prevent the gun recoil from causing catastrophic damage to the guns in the cluster, promotes premature wear in and damage to the shackles, chains, hoses and cables.

FIG. 2 illustrates placement of barrels 10, 12, 14 and 16 in a multi-barrel gun module 30 of the preferred embodiment of the present invention. Barrels 10, 12 14 and 16 are disposed at 90° intervals in the same plane about control head 32 of gun module 30 with their head ends adjacent to control head 32. Gun module 30 is suspended from boom 34 by shackle and chain assemblies 36 in a manner to minimize water drag by orienting guns 10 and 14 parallel to boom 34. Drag can be further reduced by streamlining the tail of barrel 10 via a nose cone 38 as shown in broken lines, and by giving barrels 12 and 16 an airfoil-type cross section over at least a portion of their length as shown in broken lines at 40 with respect to gun 12. Similarly, control head 32 may be streamlined. Additional chains and shackles (not shown) may be used, if required, to secure the tails of barrels 12 and 16 to boom 34 to prevent rocking or yawing of the gun module 30 while under tow. A single air supply hose 42 runs to control head 32 from boom 34, and a master electrical control cable 44 runs from boom 34 to terminal 46, whereat gun control cables 48 which were grouped in master cable 44 extend individually to their respective positions to control head 32 as will be further described shortly with respect to FIGS. 3 and 4. Boom 34, normally with a plurality of gun modules 30 suspended therefrom, is in turn suspended by cables 50 from a float or paravane (not shown) in a manner well known in the art for towing through the water. It can now be easily recognized that the symmetrical barrel orientation of the preferred embodiment not only balances gun recoil forces, permitting rigid inter-barrel connection, but maintains all of the exhaust ports in the same plane and therefore at equal vertical distances from the target area. The rigid connection of barrels 10, 12, 14 and 16 to control head 32 assures precise port location relative to the other ports of the module, promoting continued optimum design performance even after many firings. Moreover, overall drag of gun module 30 is less than that of the prior art clusters, and fewer shackles and chains are required, as is only one air hose. Moreover, the consolidation of gun control cables 44 into a master cable until in close proximity to control head 32 provides easier handling, less drag and better cable protection than in a prior art gun cluster.

FIGS. 3 and 4 depict the four barrel gun module 30 of the preferred embodiment in greater detail, including a sectional view of barrel 14. High pressure air, used to generate the acoustic pulses in barrels 10–16, is supplied via hose 42 (not shown, see FIG. 2) to inlet 52 at the center of control head 32, inlet 52 communicating with each barrel via a manifold arrangement 54 and fill passage 56 shown with respect to barrel 14. Air from hose 42 thus enters spring chamber 58 of each barrel, gun, again as shown in section on barrel 14. The air, acting on the exposed areas of sleeve-type shuttle 60 of each barrel, and prevented from escaping from spring chamber 58 by seal assemblies 62 and 64, forces each shuttle 60 outward toward the tail 66 of each barrel whereat pulse chamber 68 is located, sealing pulse chamber 68 by sealing against face seal 70. After a few seconds, pulse chamber 68 is at full line pressure in hose 42, having been filled from fill passage 56 via laterally extending fill orifices 57, and the multi-barrel gun module 30 is ready to fire.

Firing is effected by sending individual electrical pulses from the towing vessel through cables 48, (see FIG. 2) which communicate with a solenoid valve 74 associated with each barrel of the gun module. A suitable solenoid valve is shown in detail and described in U.S. Pat. No. 4,623,033, assigned to the assignee herein, but any suitable solenoid or other type of valve design such as is known in the prior art may be employed. The solenoid valves 74 react to the pulses by opening, which connects each fill passage 56 to its associated firing passage 76 to allow the high pressure air to enter firing chamber 78 via laterally extending orifices 80. Firing chamber 78 is bounded by seal assembly 64 and seal assembly 82, so the firing chamber pressure acts against shuttle 60 in a direction toward control head 32, moving shuttle 60 away from pulse chamber face seal 70 due to the differential between the shuttle surface areas acted upon in firing chamber 78 and spring chamber 58. As shuttle 60 moves away from face seal 70, pulse chamber air flows outward across shuttle face 84, but is prevented from leaving the barrel by overlapping lip 86 of pulse chamber housing 90. This arrangement provides an additional force in combination with the firing chamber forces to accelerate the shuttle more rapidly to its open position wherein a 360 degree open port is created to discharge the air from pulse chamber 68. As this sequence of events occurs simultaneously in all barrels of a module, air is discharged simultaneously from the pulse chamber 68 of each barrel into the surrounding water, resulting in the desired broadband acoustic pulse.

As all shuttles 60 of the gun module 30 move toward control head 32, the solenoid-actuating electrical pulses have decayed and the valves 74 are now closed, sealing firing chambers 78 from the air supply of hose 42. The firing chamber exhaust vent ports 92 of barrels 10–16, which were closed when the gun was fired, are now open, allowing firing chambers 78 to vent to the water. The individual shuttle openings of each barrel have been monitored by timing coils 94, which generate signals transmitted back to the towing vessel via cables 48 when approached by magnets 96 at the head end of the shuttles. After a few milliseconds, both the pulse chamber 68 and firing chamber 78 of each barrel are exhausted and the only remaining force on shuttle 60 is that in spring chamber 58, which closes shuttle 60 against face seal 70. Each gun 10, 12, 14 and 16 of the multi-barrel gun module 30 then refills with air from hose 42 and the firing cycle is ready to be repeated.

Figure 5:
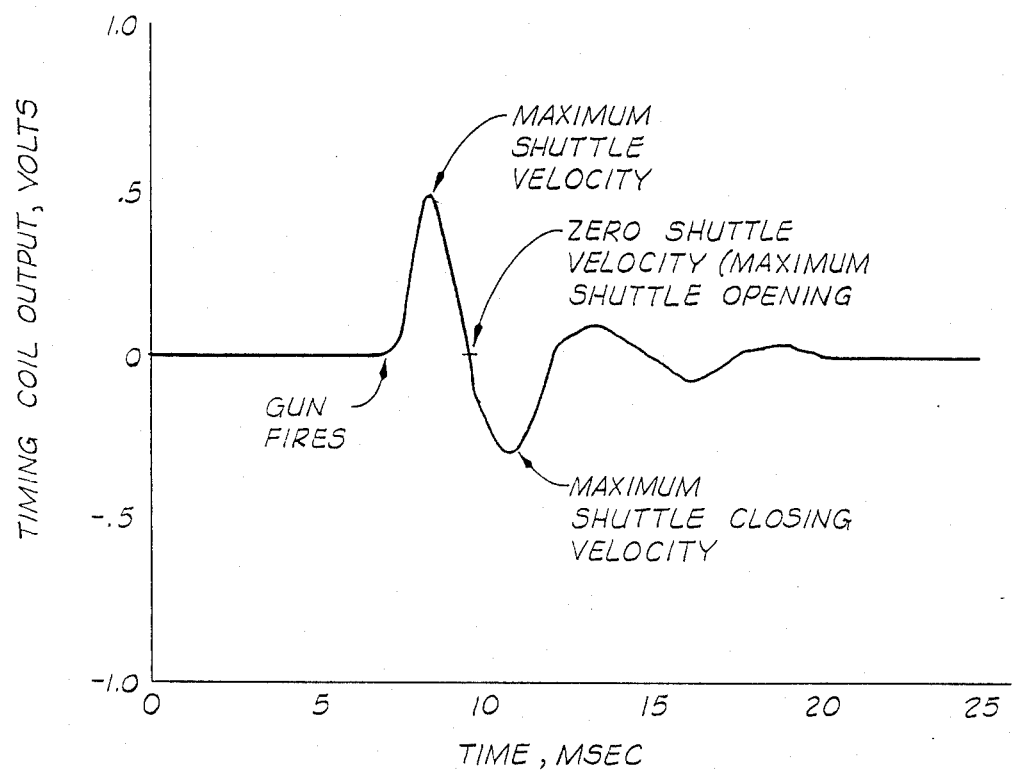
FIG. 5 is a graphic representation of a typical timing signal for an individual air gun or barrel of a multi-barrel gun module.

Since each barrel of the gun module is monitored by its own timing coil 94, which typically generates a pulse such as is illustrated in FIG. 5, the pulse data can be employed to adjust the firing times of the individual barrels of the gun module in order to compensate for barrels which fire slower or faster than others in the module due to solenoid variations, manufacturing tolerances, differing frictional drag of components and ongoing wear during a multitude of firing cycles. With such compensation, as taught in U.S. Pat. Nos. 4,034,827 and 4,047,591, both assigned to the assignee herein, synchronization of the times of maximum shuttle openings of all module barrels to achieve the most distinct and powerful pulse obtainable can be achieved and maintained throughout an operation, and malfunctioning guns quickly identified. It is, of course, possible to employ only one solenoid valve per module to fire all of the barrels, but this approach forfeits the synchronization ability of a one timing coil and solenoid per barrel arrangement.

From the description of the preferred embodiment, it can be seen that the recoil forces from gun barrel shuttles 60 are balanced against each other in the present invention, and that the use of timing means such as timing coils 94 in association with each shuttle further enhances the recoil balancing effect of the present invention.

The detailed description has referred to the term "barrel" to describe a structure for producing an air discharge to develop a seismic pulse. However, it should be understood, as noted previously, that the specific "barrel" or pulse-generating structure as described herein is for purposes of illustration only and that many other structures as known in the art for performing the same function can be employed with the present invention and will benefit from its novel and unobvious arrangement and characteristics.

While the present invention has been described in terms of a preferred embodiment, it should be understood that the invention is not so limited. For example, it is contemplated that the invention may be utilized with explosive gas guns as known in the prior art, that barrels of a module may be of differing pulse chamber volumes; that less than or more than four barrels may be employed, two barrels aligned head to head or three disposed at 120° intervals being equally feasible, three barrels in fact giving the best additive effect per barrel of multiple barrel gun assemblies in excess of two barrels; four barrels may be disposed in a tetrahedral orientation for full recoil balancing, or six in three-axis balancing orientation. As noted above, only one solenoid per module may be employed, and the gun valving and timing mechanisms disclosed herein are not to be construed as limitations, but are merely illustrative as suitable for use with the present invention. It will be apparent to one of ordinary skill in the art that the foregoing and other additions, deletions and modifications to the preferred embodiment are possible without departing from the spirit and scope of the claimed invention.

I claim:

1. A module for the generation of seismic pulses in a marine environment, comprising:
   control head means;

a plurality of pulse sources symmetrically disposed about and rigidly secured to said control head means; and actuating means associated with said control head means for independently actuating each of said pulse sources; and wherein said plurality of sources comprises four airgun barrels, said module is suspended from longitudinally extending boom means, and two of said four barrels are oriented parallel to said boom means.

2. The apparatus of claim 1, further including timing means associated with said control head means for monitoring the timing of the actuation of each of said pulse sources responsive to said actuation means.

3. The apparatus of claim 2, wherein said pulse sources each comprise an air gun barrel having a head end and a tail end, said barrels are rigidly secured at their head ends to said control head means and said actuating means comprises one solenoid valve means for each said air gun barrel.

4. The apparatus of claim 3, wherein said timing means comprises one timing coil means for each said air gun barrel.

5. The apparatus of claim 4, wherein said module is adapted to be towed in said marine environment via said boom means, and the barrel extending in the direction of tow includes nose cone means on its tail end.

6. The apparatus of claim 4, wherein the two of said four barrels not oriented parallel to said boom means includes airfoil means covering at least a portion thereof.

7. The apparatus of claim 4, further including a single air supply conduit for said module extending to said control head means.

8. The apparatus of claim 7, wherein said control head means includes a manifold extending from said conduit to each of said barrels and to each of said solenoid valve means.

9. A multi-barrel seismic pulse air gun module for the generation of seismic pulses in a marine environment, comprising:

control head means;

a plurality of air gun barrels symmetrically disposed about and rigidly secured to said control head means; and air gun actuating means associated with said control head means for independently actuating each of said air gun barrels; and wherein said plurality of barrels comprises at least three barrels, and at least one barrel is oriented in the direction of movement of said gun module during seismic operations.

10. The apparatus of claim 9, wherein said air gun actuating means includes an air flow control means and gun timing means for each barrel associated with said gun module.

11. The apparatus of claim 10, wherein said symmetrical disposition of barrels lies in a single plane.

12. The apparatus of claim 11, wherein said plurality of barrels comprises four barrels, said gun module is towed from a longitudinally extending boom, and two of said barrels are oriented parallel to said boom.

13. A method of actuating a module for the generation of seismic pulses in a marine environment, wherein said module includes a plurality of pulse sources, in order to attain substantial simultaneity of pulse generation and minimization of unbalanced forces on said module resulting from said pulse generation, comprising:

providing a control head;

rigidly securing said plurality of pulse sources to said control head in symmetrical disposition thereabout;

independently actuating each of said plurality of pulse sources;

monitoring the timing of the actuation of each of said pulse sources with respect to each other; and adjusting the timing of actuation of each of said pulse sources responsive to said monitoring, whereby substantial simultaneity of pulse generation is attained, and unbalanced forces on said module resulting therefrom are minimized; and wherein said plurality of pulse sources comprises at least three airgun barrels, and at least one barrel is oriented in the direction of movement of said module during seismic operations.

* * * * *